United States Patent
Halimi et al.

(10) Patent No.: US 6,844,536 B2
(45) Date of Patent: Jan. 18, 2005

(54) DEVICE FOR THAWING SUSHI OR SIMILAR FOODSTUFFS USING MICROWAVES

(75) Inventors: Jean-Charles Halimi, Paris (FR); Ghilhem Du Repaire, Paris (FR)

(73) Assignee: Marco Polo Foods (FR)

( * ) Notice: Subject to any disclaimer, the term of this patent is extended or adjusted under 35 U.S.C. 154(b) by 0 days.

(21) Appl. No.: 10/320,199

(22) Filed: Dec. 16, 2002

(65) Prior Publication Data

US 2003/0116562 A1 Jun. 26, 2003

Related U.S. Application Data

(63) Continuation of application No. PCT/FR02/02857, filed on Aug. 12, 2002.

(30) Foreign Application Priority Data

Aug. 13, 2001 (FR) .............................................. 01 10773
May 13, 2002 (FR) .............................................. 02 05862

(51) Int. Cl.[7] .................................................. H05B 6/80
(52) U.S. Cl. ........................ 219/729; 219/730; 219/734; 219/762; 426/107; 426/234; 426/524; 99/DIG. 14
(58) Field of Search ................................. 219/729, 730, 219/734, 735, 725, 762; 426/107, 234, 241, 243, 524; 99/DIG. 14

(56) References Cited

U.S. PATENT DOCUMENTS

| 3,865,301 A | * | 2/1975 | Pothier et al. ............... 219/729 |
| 4,233,325 A | * | 11/1980 | Slangan et al. ............. 426/107 |
| 4,785,160 A | * | 11/1988 | Hart ........................... 219/730 |
| 4,794,008 A | * | 12/1988 | Schmidt et al. ............. 426/234 |
| 5,861,184 A | * | 1/1999 | Ishino et al. ................. 426/107 |

FOREIGN PATENT DOCUMENTS

| JP | 5-184314 | * | 7/1993 | .................. 426/241 |
| JP | 5-219906 | * | 8/1993 | .................. 426/126 |
| JP | 06269253 | | 9/1994 | |
| JP | 09149768 | | 6/1997 | |
| JP | 10-290673 | * | 11/1998 | |
| JP | 11262447 | | 9/1999 | |
| JP | 11290206 | | 10/1999 | |

* cited by examiner

*Primary Examiner*—Philip H. Leung
(74) *Attorney, Agent, or Firm*—Piper Rudnick LLP

(57) ABSTRACT

The invention relates to a device for thawing at least one piece of sushi or similar foodstuff formed from a principal element intended to be served warm and at least one accompanying element intended to be served cold with a microwave oven. The device includes a package having at least one bottom, lateral walls and a top wall; and a microwave-reflective layer on an interior surface, wherein the top wall is permeable to microwaves and includes at least one cut-out to receive and hold the sushi or similar foodstuff.

14 Claims, 4 Drawing Sheets

DEVICE FOR THAWING SUSHI OR SIMILAR FOODSTUFFS USING MICROWAVES

RELATED APPLICATION

This is a continuation of PCT/FR02/02857 filed Aug. 12, 2002 which claims benefits from French Patent Application No. 01/10773 filed Aug. 13, 2001 and French Patent Application No. 02/05862 filed May 13, 2002.

FIELD OF INVENTION

This invention relates to thawing sushi, more specifically, to a device for thawing by means of a microwave oven at least one piece of sushi or similar foodstuff of the type constituted by a principal element intended to be served warm such as, for example, rice or bread, and at least one accompanying element intended to be served cold.

BACKGROUND

There are different families of sushi:

Nigiri sushi: prepared rice ball (vinegar, sugar, salt) topped by a thin slice of raw fish or vegetable;

Maki sushi: prepared rice roll surrounded by dry seaweed and stuffed with a piece of raw fish or vegetable;

Guncan: prepared rice ball surrounded by dry seaweed and stuffed with vegetable, fish eggs or a vegetable- or fish-based preparation.

Thus, all sushi is comprised of rice as well as at least one accompanying element.

Sushi is traditionally assembled just before its consumption, using sticky warm rice (between 20 and 30° C.) and one or more cool accompanying elements, i.e., at a temperature below 20° C. There are also foodstuffs that can be presented in a general manner like sushi as presented above. For example, canapés made from a slice of warm bread on which are deposited a layer of pâté, fruit or vegetables, fish eggs, partially cooked foie gras and the like.

When deep-frozen sushi or similar foodstuffs are proposed, the principal problem stems from the requirement of thawing in a manner such that the gustatory taste is a close as possible to those of products prepared in the traditional manner.

In fact, if the sushi or similar foodstuff is merely thawed with a microwave by simply placing the sushi or similar foodstuff in the oven, the principal element, i.e., the rice of the sushi or the bread, thawed in this manner is dried out and crumbles when it is grasped, on the one hand, and the accompanying element(s) begin(s) to be strongly heated and even to be cooked, on the other hand.

Already known in the prior art are specific devices for thawing sushi Thus, it is proposed in Japanese patent application No. 06/269253 to create a package formed by a container intended to receive a piece of frozen sushi, which container is closed with a cover. This container is made of a very thin metal foil, e.g., aluminum, to reflect the microwaves. The foil is connected to a synthetic resin support system except in a central part. The cover is made of the same material as the container, except for a central elliptical window allowing transmission of the microwaves. The side surfaces of the covers do not bear metal foil. Thus, the sushi placed inside such a container closed by means of such a cover is entirely surrounded by material that is strongly reflective of microwaves, with the exception of just above and just below the sushi where plastic material is found which allows passage of the microwaves.

The result is that the heat inside the package increases very quickly and very intensely, which has the effect of heating not only the rice but also the cool element(s) positioned around it or inside it, whereas this (these) element (s) should only be thawed and should conserve a temperature below 20° C.

It would therefore be advantageous to resolve the drawbacks of the prior art by providing a package that makes it possible to efficiently thaw one or more pieces of sushi or similar foodstuffs, i.e., to heat up the principal element (e.g., rice or bread) without heating up the accompanying element (s).

SUMMARY OF THE INVENTION

The invention relates to a device for thawing at least one piece of sushi or similar foodstuff formed from a principal element intended to be served warm and at least one accompanying element intended to be served cold with a microwave oven. The device includes a package having at least one bottom, lateral walls and a top wall; and a microwave-reflective layer on an interior surface, wherein the top wall is permeable to microwaves and includes at least one cut-out to receive and hold the sushi or similar foodstuff.

BRIEF DESCRIPTION OF THE DRAWINGS

Better understanding of the invention will be obtained from the description below, presented in a purely explanatory manner, of a mode of implementation of the invention with reference to the attached figures.

DETAILED DESCRIPTION

Figure 1:
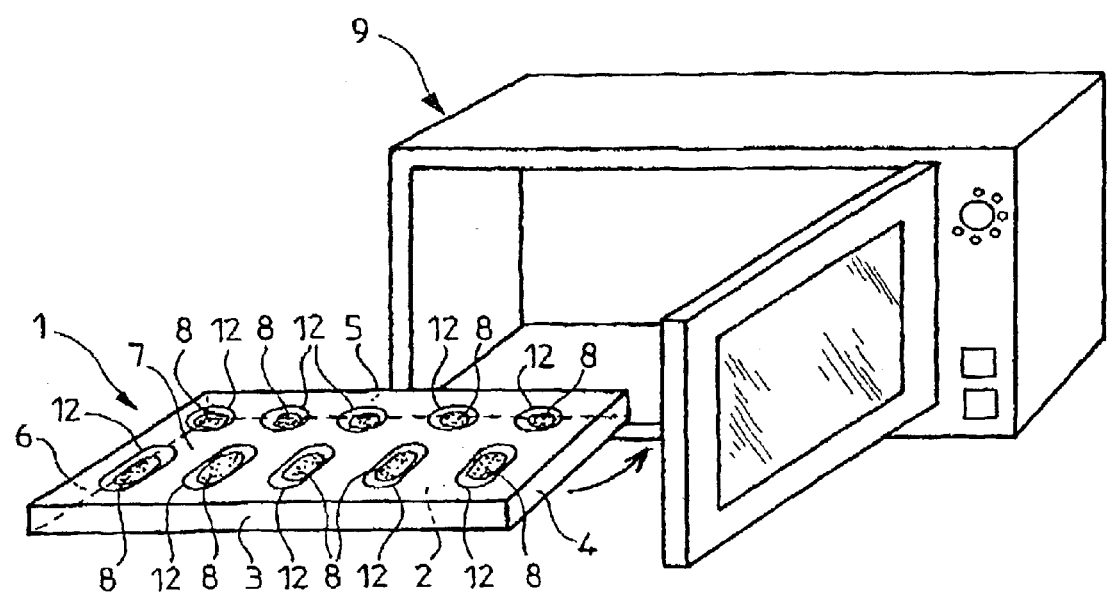
FIG. 1 is a perspective view of a device according to the invention.

The invention is in the form of a package having at least a bottom, lateral walls and a top wall, the bottom having on its interior surface a microwave-reflective layer. It is remarkable in its broadest sense in that the top wall comprises at least one cut-out for the passage of the sushi or similar foodstuff and does not have or contain a reflective layer. The microwave oven employed is, of course, of the type commonly used in cooking. No particular adjustment is required to use the standard equipment. At least part of the lateral walls preferably have on their interior surface a microwave-reflective layer.

The cut-out(s) is (are) preferably of substantially circular or oblong shape such that each piece of sushi or similar foodstuff is maintained at the level of the top wall of the device.

In a first variant of implementation, the package is constituted of a container and a cover. The container is preferably constituted of a cardboard sheet on which is deposited a metallic foil and in that the cover is constituted of a cardboard sheet not bearing or having metallic foil, means being provided to enable assembly of the container and the cover.

In this first variant, the means are preferably constituted of at least one flap located on the container or the cover, the flap being designed to cooperate with a slit provided on the cover or the container respectively.

The container is preferably constituted of a blank designed to be folded and having a base of length L and width 1, as well as two longitudinal walls having a length L and a width a and two lateral walls having a width 1 and a length a.

The cover is preferably constituted of a blank designed to be folded and has a base of length L' and width 1', as well as two longitudinal walls having a length L' and a width a' and two lateral walls having a length 1' and a length at least equal to a'.

The lateral walls preferably have a length equal to N×a, N being a number greater than 1, to form a reinforcement by successive folding of said lateral walls. The distance a is preferably essentially equal to a'.

In a second variant of implementation, the package is constituted of a single cardboard sheet forming the device according to the invention after folding along grooves and gluing along at least one flap. In this second variant, the longitudinal walls or the lateral walls are preferably each constituted of two parts positioned respectively at the lateral or longitudinal ends of the top wall and the bottom, the parts having connecting means for formation of the walls.

The connecting means are preferably constituted of a tab located at the end of one part and a slot located in the other part to enable formation of the corresponding wall by introduction of the tab into the slot.

The invention also pertains to frozen sushi or similar foodstuff or a prepared dish based on frozen sushi or similar foodstuffs, the sushi or similar foodstuff being of the type constituted of a principal element intended to be served warm, such as, e.g., rice or bread, and at least one accompanying element intended to be served cold, remarkable in that the sushi or similar foodstuff(s) is (are) each positioned in a cut-out of a device according to the invention.

The invention advantageously comprises a device which makes available one or more pieces of sushi or similar foodstuff such that they are properly thawed and have a taste very close to the taste of sushi or similar foodstuffs prepared in the traditional manner. The principal element (e.g., rice or bread) is suitably warm and the accompanying elements are suitably thawed—they taste like the fresh product.

The invention advantageously comprises a device in which the sushi or similar foodstuffs can be placed prior to deep freezing or freezing, this device making it possible to directly thaw the sushi or similar foodstuffs to provide them with a presentation and taste essentially identical to that of sushi or similar foodstuffs prepared in the traditional manner. The device thus forms a freezing and thawing package.

Preparation of the sushi or similar foodstuffs by a user is advantageously very simple: all that needs to be done is to take the device according to the invention out of the freezer, remove any possible supplementary packaging, put the device in a microwave oven and allow the oven to operate for an appropriate period of time. This device is moreover inexpensive to manufacture because its fabrication and assembly can be entirely automated.

A piece of sushi or similar foodstuff according to the invention is normally constituted of a principal element such as rice or bread or a cooked paste and at least one accompanying element or garnish such as fish, meat or a piece of vegetable or fruit or a preparation based on fish, meat, fruit or vegetables.

Turning now to the drawings, the device (1) for thawing by means of a microwave oven (9) at least one piece of sushi (12) or similar foodstuff according to the invention is illustrated in FIG. 1. The device (1) is in the form of a package having at least a bottom (2), lateral walls (3, 4, 5, 6) and a top wall (7). The device (1) thus forms a box, for example, with 6 sides.

The bottom (2) has on its interior surface a microwave-reflective layer which does not allow penetration by microwaves. Such a layer may be obtained by affixing a metallic foil on the interior surface of the bottom (2). The device (1) according to the invention is characterized in that the top wall (7) is permeable by microwaves, i.e., that it allows penetration by microwaves and comprises at least one cut-out (8) for the passage of said sushi (12) or similar foodstuff. The top wall (7), thus, does not bear or have a microwave-reflective layer on either its interior surface or its exterior surface.

At least part of the lateral walls (3, 4, 5, 6), or the totality of the lateral walls (3, 4, 5, 6), preferably have on their interior surface a microwave-reflective layer to augment the effect obtained by means of the bottom (2). Thus, the piece(s) of sushi (12) or similar foodstuff(s) undergo an augmentation of heat at their base, which is in contact with the bottom (2), by means of the accumulation of heat stemming from the microwave-reflective material. However, the top part of the piece(s) of sushi or similar foodstuff(s) is only subjected to a very mild augmentation of heat: this part is (are) just suitably thawed. The top wall (7), which allows penetration of the microwaves, acts as a heat deflector to conserve a suitable amount of heat in the interior of the package.

The device according to the invention, thus, enables thawing at two different rates for two different constituents according to their position in the package or above the package.

The cut-out (8) preferably has an opening section essentially of the same dimension as the section of the principal element. It is important that each cut-out allow the microwaves to reach the sushi (12) or similar foodstuff the top part of which is at the level of the cut-out. The device (1), thus, forms a presentation tray which can be embellished by decorative elements or imprinted.

Figure 2:
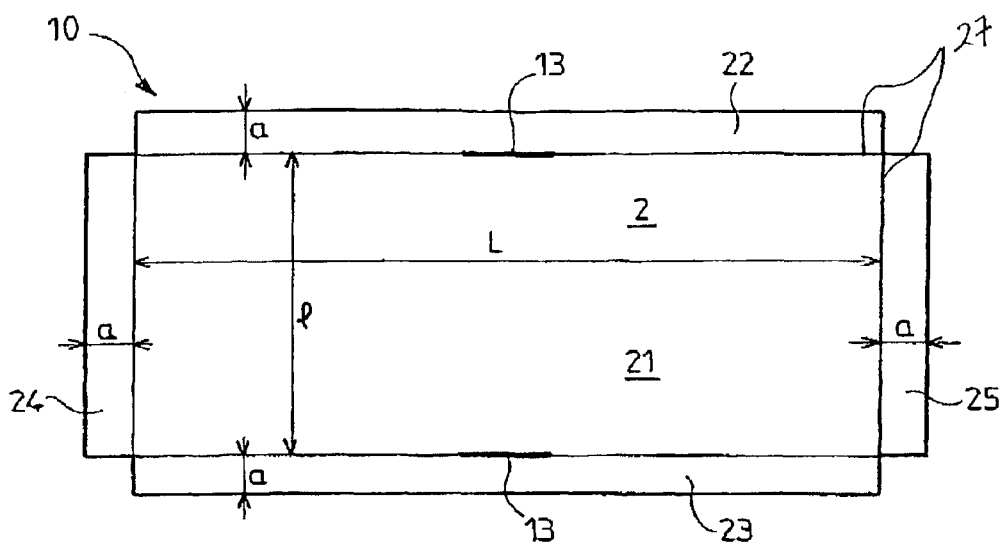
FIG. 2 is a front view of the blank for creation of the container according to the first variant of the device according to the invention.
Figure 3:
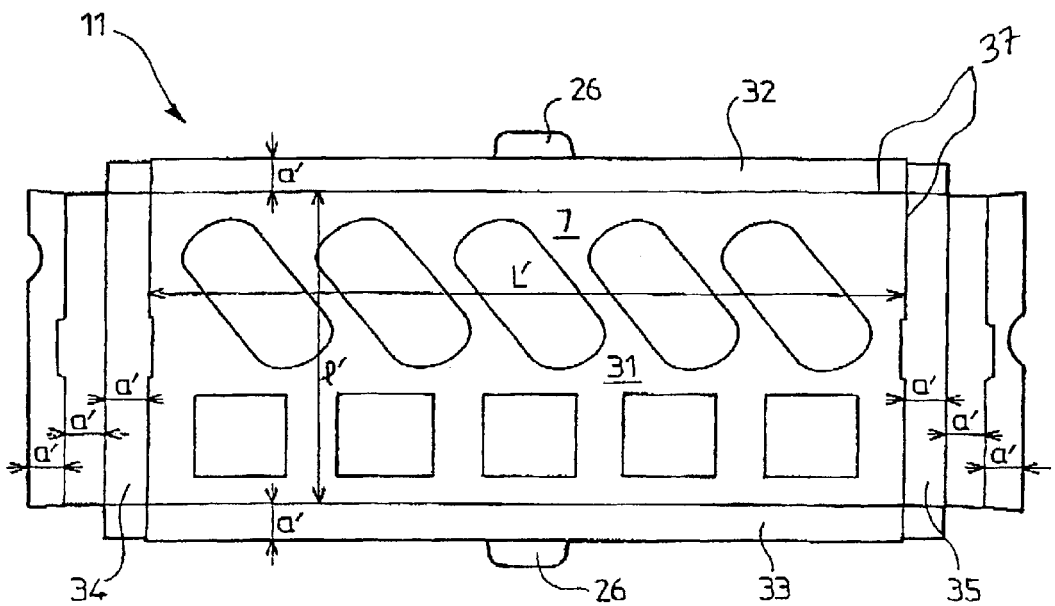
FIG. 3 is a front view of the blank for creation of the cover according to the first variant of the device according to the invention.

In a first variant of implementation of the invention illustrated in FIGS. 2 and 3 the package comprising the device (1) is constituted of a container (10) and a cover (11).

The container illustrated in FIG. 2 is constituted of an alimentary cardboard sheet on which is deposited a metallic foil composed essentially preferably of aluminum. This metallic foil is, for example, glued on the interior surface of the cardboard sheet. The cover (11) illustrated in FIG. 3 is constituted of an alimentary cardboard sheet without metallic foil. Means are provided to enable assembly of the container (10) and the cover (11).

The means enabling assembly of the container (10) and the cover (11) are preferably constituted of at least one flap (26) located on the container (10) or the cover (11), the flap (26) being designed to cooperate with a slit (13) provided, respectively, on the cover (11) or the container (10).

The container (10) is constituted of a blank designed to be folded and having a base (21) forming the bottom (2) of the device (1) of length L equal, e.g., to 236 millimeters and of width 1 equal, e.g., to 111 millimeters, as well as two longitudinal walls (22, 23) having a length L and a width a and two lateral walls (24, 25) having a width 1 and a length a, with a being equal, e.g., to 13 millimeters. Thus, a container (10) is created when the lateral walls (22, 23, 24, 25) are folded along grooves (27) essentially at 90° in relation to the plane formed by the base (21).

The cover (11) is constituted of a blank designed to be folded and has a base (31) forming the top wall (7) of the device (1) of length L', slightly greater than L and equal, e.g., to 240 millimeters, and of width 1', slightly greater than 1 and equal, e.g., to 115 millimeters. The blank, moreover, has two longitudinal walls (32, 33) having a length L' and a width a' and two lateral walls (34, 35) having a width 1' and a length at least equal to a'. Thus, when the lateral walls (32, 33, 34, 35) are folded along the grooves (37), essentially at 90° in relation to the plane formed by the base (31), a cover (11) is formed.

The lateral walls (34, 35) have a length equal to N×a, N being a number greater than 1, to form a reinforcement by successive folding of said lateral walls (34, 35). In the version illustrated in FIG. 3, N=3. However, it can be useful to decrease the value of a corresponding essentially to the thickness of the cardboard (e.g., 1 millimeter) beyond N=2. The distance a is preferably essentially equal to a', to create a box having adequate rigidity and facilitate handling of the device (1).

The external surface of the cover (11) can be imprinted with an advertisement and/or instructions for use.

No glue is required for the respective assembly of the container (10) and the cover (11), nor for putting the container (10) and the cover (11) together for the creation of the device (1) according to the first variant.

Figure 4:
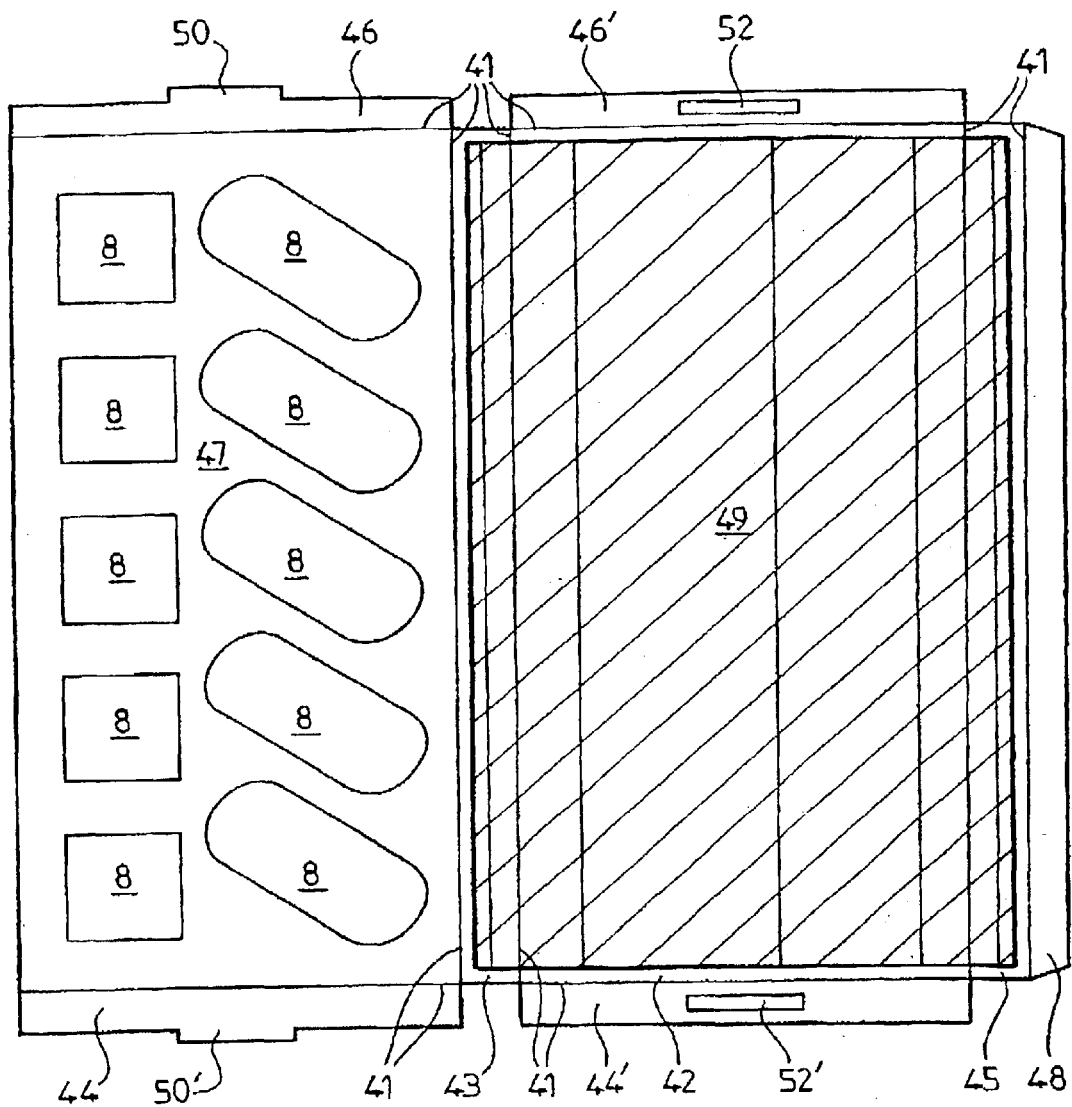
FIG. 4 is a view of the interior surface of the blank for creation of the container according to the second variant of the device according to the invention.
Figure 5:
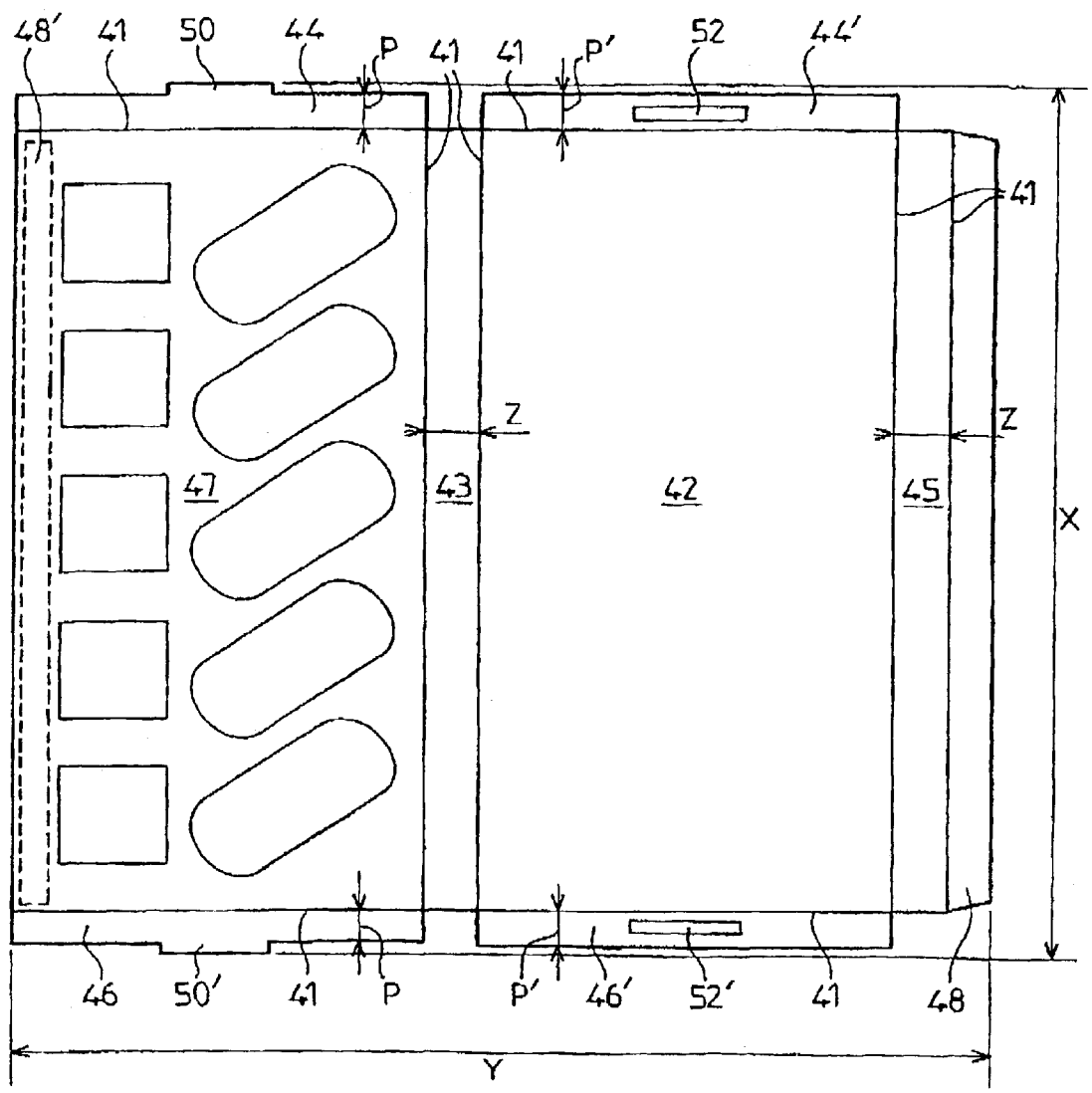
FIG. 5 is a view of the exterior surface of the blank for creation of the container according to the second variant of the device according to the invention.

In a second variant of implementation of the invention illustrated in FIGS. 4 and 5, the package comprising the device (1) is constituted of a single cardboard sheet forming the device (1) after folding along the grooves (41) and gluing along at least one flap (48) on a gluing zone (48'). The flap (48) is located at the free end of a lateral wall (45) and the gluing zone (48') is located on the interior surface of a top wall (47).

The cardboard blank to be folded and glued to form the device (1) has a base (42) forming the bottom (2) of the device (1), a top wall (47) forming the top wall (7) of the device (1), as well as the longitudinal walls (43, 45) forming the longitudinal walls (3, 5) of the device (1) and the lateral wall parts (44, 44', 46, 46') forming the lateral walls (4, 6) of the device (1).

The microwave-reflective layer is constituted of a metallic foil, e.g., made of aluminum, glued on the interior surface of the base (42) and extending onto the longitudinal walls (43, 45) as can be seen in FIG. 4. The lateral walls (4, 6) of the device (1) are each constituted of two lateral wall parts (44, 44') and (46, 46') respectively located at the longitudinal ends of the top wall (47) and the base (42), respectively. The lateral wall parts (44, 44', 46, 46') have connecting means for the formation of the lateral walls (4, 6). These connecting means are each constituted of a tab (50, 50') located at the longitudinal end of each lateral wall part (44, 46) and a slot (52, 52') located in each lateral wall part (44', 46'), respectively. Introduction of a tab (50, 50') of a lateral wall part (44, 46) into a slot (52, 52') of a lateral wall part (44', 46') enables formation of the lateral walls (4, 6), respectively, of the device (1). It can also be envisaged that the flap (48) is positioned at a longitudinal end of a lateral wall and the tabs and the slots are positioned on the longitudinal walls (3, 5).

The cardboard blank illustrated in FIG. 5 has an overall length X equal, e.g., to 267 millimeters, and an overall width Y equal, e.g., to 276 millimeters, and the device (1) has a thickness Z, e.g., of 15 millimeters after it has been formed. This thickness corresponds to the width of the longitudinal walls (43, 45). The width of the base (42) is approximately 115 millimeters and that of the top wall (47) is slightly smaller at approximately 114 millimeters. The width of the flap (48) is approximately 12 millimeters. The length of the flap (48) is equal to the length of the top wall (47) and the base (42).

The metallic foil has a length of approximately 235 millimeters and a width of approximately 140 millimeters.

The two lateral walls (44, 46) have a length P of approximately 10 millimeters and the two lateral walls (44', 46') present a length P' slightly greater than P at approximately 12 millimeters.

The tabs (50, 50') have a length of approximately 3 millimeters and the slots (52, 52') have a slightly greater length at approximately 4 millimeters. Similarly, the width of the tabs (50, 50') is slightly smaller than that of the slots 52, 52'). The slots (52, 52') are located approximately 4 millimeters from the lateral edge of the lateral wall parts (44', 46') and approximately 4 millimeters from the grooves (41) separating the lateral wall parts (44', 46') from the bottom (42).

Thus, a package forming a device (1) according to the second variant of implementation of the invention is obtained when the lateral wall parts (43, 44, 44', 45, 46, 46') are folded along the grooves (41) essentially at 90° in relation to the plane formed by the base (42), the flap (48) is glued on the gluing zone (48') and the tabs (50) are introduced into the slots (52).

In both variants of implementation of the invention, the cut-out(s) (8) are of circular or oblong shape such that each piece of sushi is maintained at the level of its top part against the top wall (7) of the container (1). The oblong cut-outs are more specifically intended for Nigiri type sushi and the circular cut-outs are more specifically intended for Maki type sushi, the axis of which would be positioned perpendicular to the bottom (2).

The flexibility of the material used makes it easy to grasp the sushi or other foodstuffs thawed in this manner.

In both variants of implementation of the invention, once the sushi or similar foodstuffs have been correctly placed in the cut-outs, the device (1) can be covered by one or more supplementary packaging materials or cases each constituted of, e.g., a plastic film or supplementary cardboard packaging that is removed prior to thawing in the microwave oven.

It is then simple for the user to remove the supplementary packaging material(s) before putting the device in a microwave oven and positioning the bottom of the device on the tray of the microwave oven. As an example, one minute at 900 watts is sufficient for preparing a plate of sushi (12) placed in a device according to the invention.

The invention also pertains to the frozen sushi (12) or similar foodstuffs and to dishes prepared from the frozen sushi (12) or similar foodstuffs when the sushi (12) or similar foodstuffs are each placed in a cut-out (8) of a device (1) according to the invention.

The invention is described above as an example. One of ordinary skill in the art can implement different variants of the invention without going beyond the scope of the patent, which is defined in the appended claims.

What is claimed is:

1. A device for thawing at least one piece of sushi or other foodstuff formed from a principal element intended to be served warm and at least one accompanying element intended to be served cold with a microwave oven comprising:

a package having a base member with bottom and top surfaces connected to lateral walls; and a microwave-reflective layer on said bottom surface, wherein said top surface is permeable to microwaves and comprises at least one cut-out that receives and simultaneously holds both of said principal and accompanying elements of said sushi or other foodstuff prior to application of microwaves.

2. The device according to claim 1, further comprising a microwave-reflective layer on at least part of said lateral walls on interior surfaces thereof.

3. The device according to claim 1, wherein said cut-out(s) is (are) of circular or oblong shape such that each piece of sushi or similar other foodstuff is maintained at a level of the top surface.

4. The device according to claim 1, further comprising:

a container comprising a cardboard sheet on which is deposited a metallic foil; a cover comprising a cardboard sheet not bearing metallic foil; and means to enable assembly of said container and said cover.

5. The device according to claim 4, wherein said means to enable assembly comprises at least one flap located on said container or said cover, said flap cooperative with a slit on said cover or said container, respectively.

6. The device according to claim 4 wherein said container comprises a blank adapted to be folded and having a base of length L and with 1, two longitudinal walls having a length L and a width a and two lateral walls having a width 1 and a length a.

7. The device according to claim 4, wherein said cover comprises a blank adapted to be folded and has a base of length L' and width 1', two longitudinal walls having a length L' and a length a' and two lateral walls having a length 1' and a length equal at least to a'.

8. The device according to claim 7, wherein said lateral walls have a length equal to N×a, wherein N is a number greater than 1 to form a reinforcement by successive folding of said lateral walls.

9. The device according to claim 7, wherein a is essentially equal to a'.

10. The device according to claim 1, wherein said package comprises a single sheet of cardboard forming said device after folding along grooves formed therein and gluing along at least one flap.

11. The device according to claim 10, wherein the longitudinal walls or the lateral walls are each formed of two parts positioned at lateral or longitudinal ends of the top wall and the bottom, respectively, said parts having connecting means for formation of said walls.

12. The device according to claim 11, wherein said connecting means comprises a tab located at an end of one part and a slot located in another part to enable formation of a corresponding wall by introduction of said tab into said slot.

13. Frozen sushi or foodstuffs or prepared dishes based on frozen sushi or foodstuff(s), said sushi or foodstuffs comprising a principal element intended to be served warm and at least one accompanying element intended to be served cold, wherein said sushi or foodstuff(s) is (are) each positioned in a cut-out of a device according to claim 1.

14. A device for thawing at least one piece of sushi or other foodstuff formed from a principal element intended to be served warm and at least one accompanying element intended to be served cold with a microwave oven comprising:

a package having a base member with bottom and top surfaces connected to lateral walls; and a microwave-reflective layer on said bottom surface, wherein said top surface holds both of said principal and accompanying elements in contact with one another prior to application of microwaves, is permeable to microwaves and comprises at least one cut-out to receive and hold said sushi or other foodstuff.

* * * * *